United States Patent
Pelletier et al.

(10) Patent No.: US 8,238,281 B2
(45) Date of Patent: Aug. 7, 2012

(54) METHOD AND DEVICE FOR SAVING POWER IN A WIRELESS USER TERMINAL

(75) Inventors: Ghyslain Pelletier, Boden (SE); Kristofer Sandlund, Lulea (SE); Johan Torsner, Masaby (FI); Jonas Pettersson, Lulea (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 336 days.

(21) Appl. No.: 12/596,782

(22) PCT Filed: Nov. 21, 2007

(86) PCT No.: PCT/SE2007/050882
§ 371 (c)(1), (2), (4) Date: Oct. 20, 2009

(87) PCT Pub. No.: WO2008/133565
PCT Pub. Date: Nov. 6, 2008

(65) Prior Publication Data
US 2010/0189022 A1      Jul. 29, 2010

(30) Foreign Application Priority Data
Apr. 27, 2007   (SE) ...................................... 0701030

(51) Int. Cl.
*G08C 17/00*   (2006.01)
(52) U.S. Cl. ....................................................... 370/311
(58) Field of Classification Search ........................ None
See application file for complete search history.

(56) References Cited

U.S. PATENT DOCUMENTS

| | | | |
|---|---|---|---|
| 2007/0286080 A1* | 12/2007 | Kim et al. | 370/236 |
| 2008/0186892 A1* | 8/2008 | Damnjanovic | 370/311 |
| 2008/0232284 A1* | 9/2008 | Dalsgaard et al. | 370/310 |
| 2009/0046650 A1* | 2/2009 | Dalsgaard et al. | 370/329 |

FOREIGN PATENT DOCUMENTS
WO   2007148175 A1   12/2007

OTHER PUBLICATIONS

3rd Generation Partnership Project. "Interaction of DRX and Downlink HARQ." R2-071273, 3GPP TSG-RAN WG2#57bis, St. Julian's, Malta, Mar. 26-30, 2007.
3rd Generation Partnership Project. "Paging for LTE." R2-061200, 3GPP TSG-RAN WG2 meeting #53, Shanghai, China, May 8-12, 2006.
3rd Generation Partnership Project. "Active Mode DRX Details." R2-070243, 3GPP TSG-RAN WG2 Meeting #56bis, Sorrento, Italy, Jan. 15-19, 2007.

* cited by examiner

*Primary Examiner* — Anh-Vu Ly
(74) *Attorney, Agent, or Firm* — Coats & Bennett, P.L.L.C.

(57) ABSTRACT

A method (300) for use in a cellular system (100) with a controlling node (110) and user terminals, UEs (130). In the system, UEs can assume one of at least two states, a non-listening state, i.e. a state during which a UE (130) does not listen for data from its controlling node (110), and a listening state, an "on duration" state. According to the method (300) a UE in the system is able to alternate (310) between said two states according to a certain scheme, the scheme according to which a UE in the system alternates between said two states being dependent on whether or not data units which are transmitted between the UE and its controlling node are received entirely and correctly within an initially allocated resource for each data unit.

16 Claims, 4 Drawing Sheets

METHOD AND DEVICE FOR SAVING POWER IN A WIRELESS USER TERMINAL

TECHNICAL FIELD

The present invention discloses a method and a device for saving power in a user terminal in a cellular wireless access system of the 3G kind.

BACKGROUND

In the Third Generation Partnership Project (the 3GPP project) for cellular wireless systems, a mechanism referred to as Discontinuous Reception (DRX) will be introduced. One purpose of DRX is to save battery time in user terminals.

By means of the DRX mechanism, a user terminal will be able to turn on and off radio resources for a certain amount of time, based on configured parameters and specified rules.

As an example of a DRX mechanism, mention might be made of the so called Continuous Packet Connectivity mechanism, CPC, for WCDMA systems, in which a DRX scheme is specified. According to this scheme, a user terminal initiates continuous usage of its radio resources (continuous reception) as soon as it receives data during a non-DRX period, and resumes a DRX state based on a "timeout" following a period in time during which no data is received.

In 3G (third generation) systems, as in many other wireless cellular systems, there is a controlling node, in 3G referred to as eNodeB, which has as one of its purposes to control traffic to and from user terminals within a certain area, a cell, in the system. In order for a DRX mechanism to function properly, a set of clear rules are needed to enable the eNodeBs of the system to determine, at all times, the state of "their" user terminals with respect to DRX, i.e. DRX or not.

In 3G systems, the solutions currently envisioned for DRX schemes don't properly take into account the fact that different kinds of transmissions or retransmissions may be used between the eNodeBs and their respective UEs. Examples of such different kinds of (re-)transmissions are transmissions which are caused by the use of HARQ, Hybrid Automated Repeated Request, and those which are caused by the use of Radio Link Control, RLC.

Current solutions for DRX schemes assume either:
that only one transmission is needed, or
that if one or more retransmissions and/or if multiple RLC segments are needed, those are handled by the DRX scheme as first transmissions, or
that once data is received, the UE will listen for an "on duration" period of time, regardless of whether or not retransmissions or new data is expected of not, which means that the radio resources will always be committed for a longer period than the actual need for listening, as the UE goes on listening until it assumes the DRX state, which is done after the expiration of a configured inactivity timer.

Generally, a packet can be transmitted using dynamic scheduling, by means of which explicit signalling is used by the eNodeB to notify the UE that data is coming, or using semi-persistent scheduling, in which the first transmission from the eNodeB is detected by the UE using so called "blind detection", and retransmissions from the eNodeB are made using scheduling assignments, as with dynamic scheduling.

In HARQ transmissions, for downlink transmissions, the UE sends a HARQ NACK to its eNodeB to request a retransmission. The eNodeB does not have advance knowledge that a retransmission will be needed, and can thus not signal in advance using MAC signalling to order the UE to assume a shorter DRX period to allow for retransmissions. A retransmission can occur after a certain amount of time, typically measured in milliseconds, during which time no resources will be used for this transmission.

In addition, with semi-persistent scheduling, which is likely to be used for VoIP, retransmissions are made using scheduling assignments just as with dynamic scheduling. The general problem that the retransmission will be delayed by the length of the DRX period is thus independent of the type of service or transmission.

SUMMARY

As explained above, there is thus a need for a solution by means of which a cellular wireless access system of the 3G kind, in particular the system known as Long Term Evolution, LTE, could overcome the problems posed by the combination of DRX intervals and different kinds of multiple transmissions, such as those caused by e.g. HARQ ACK/NACK and RLC segmentation.

The solution should also be possible to apply in other kinds of systems than LTE systems, in which there are periods similar to the DRX periods, i.e. periods during which a UE does not listen for data from its controlling node.

Such a solution is offered by the present invention in that it discloses a method for use in a cellular wireless access system, in which system there can be a first controlling node which serves, inter alia, to control transmissions to and from user terminals, UEs, within a certain area, such as a cell.

In the system in which the invention is applied UEs can assume one of at least two states, a first such state being a non-listening state, i.e. a state during which the UE does not listen for data from its controlling node, and a second such state being a listening state, i.e. an "on duration" state.

A UE in the system is able to alternate between said two states according to a certain scheme, said scheme depending on whether or not data units which are transmitted between the UE and its eNodeB are received entirely and correctly within an initially allocated resource for each data unit, said allocation having been carried out by the controlling node.

If the method of the invention is applied to a system of the LTE kind, the first non listening state will be the DRX state, and the controlling node will be an eNodeB.

Thus, the invention offers a solution by means of which the demands posed on the DRX function or similar functions by differing kinds of retransmissions (HARQ ACK/NACK and RLC segmentation) can be addressed.

This and other advantages of the present invention will become even more apparent from the following detailed description.

In addition, the invention also discloses a transceiver for use as a user terminal in a system in which the method of the invention is applied.

BRIEF DESCRIPTION OF THE DRAWINGS

The invention will be described in more detail in the following, with reference to the appended drawings, in which.

DETAILED DESCRIPTION

Figure 1:
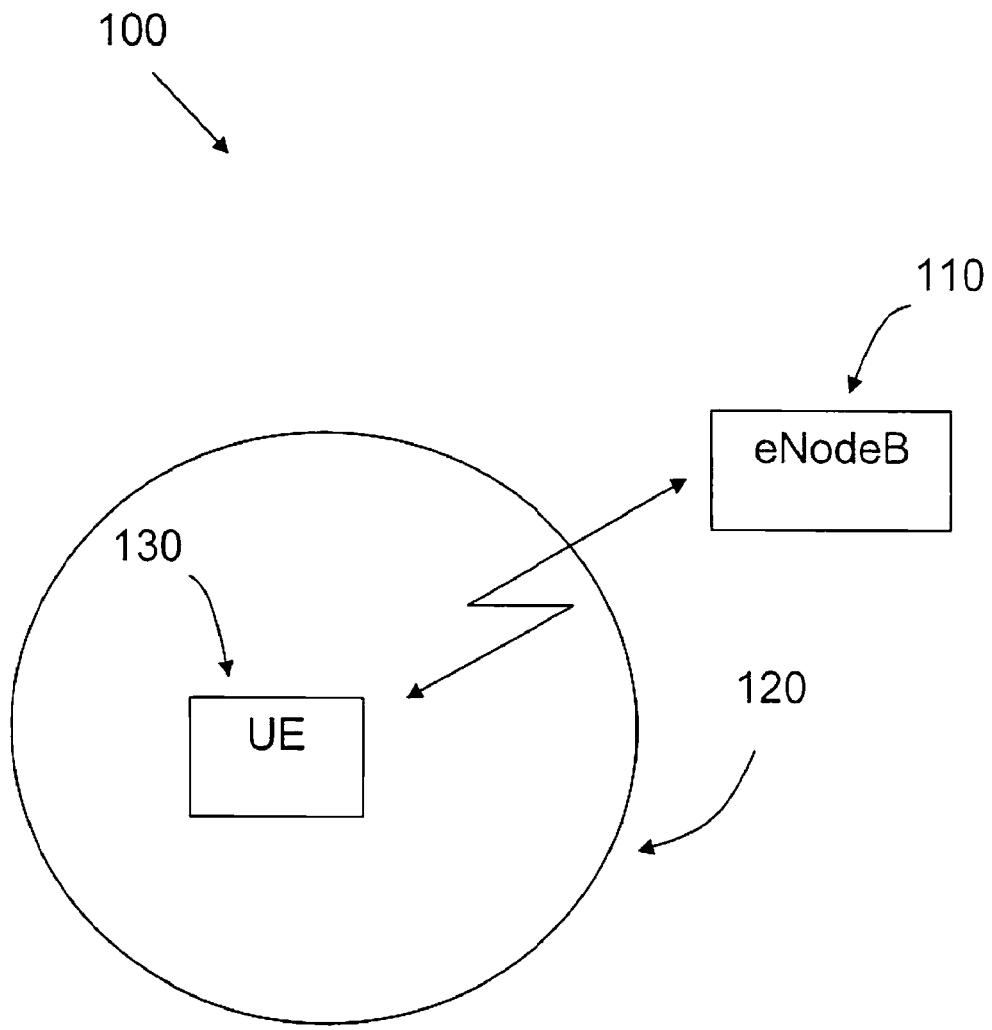
FIG. 1 shows a schematic overview of a system in which the invention may be applied.

FIG. 1 shows a rough overview of a system in which the invention can be applied. As has been mentioned previously, the system for which the invention is intended is a wireless cellular access system of the LTE kind (Long Term Evolution). Such a system will, as shown in FIG. 1, comprise a controlling node 110, which has as one of its roles to control all the traffic to and from user terminals, UEs, within a certain area, a so called cell within the system. On such cell is shown symbolically as 120 in FIG. 1, with one UE 130 within the cell.

Naturally, the number of cells in a system in which the invention is applied, and the number of UEs which can be used within such a cell can be varied greatly, the number of cells and UEs shown in FIG. 1 is merely an example intended to facilitate the reader's understanding of the present invention.

In addition, the type of system in which the invention is applied need not be an LTE type of system, the invention can be applied in other types of wireless cellular access systems as well. Thus, the use of terminology in this description of terms borrowed from LTE type systems should merely be seen as examples intended to facilitate the reader's understanding of the present invention.

As also explained previously, the invention mainly deals with problems posed by mechanisms involving periods of discontinuous reception, in LTE referred to as so called DRX periods. Before the invention is described in more detail, some basic definitions used in this text will first be explained, with reference to FIG. 2.

Figure 2:
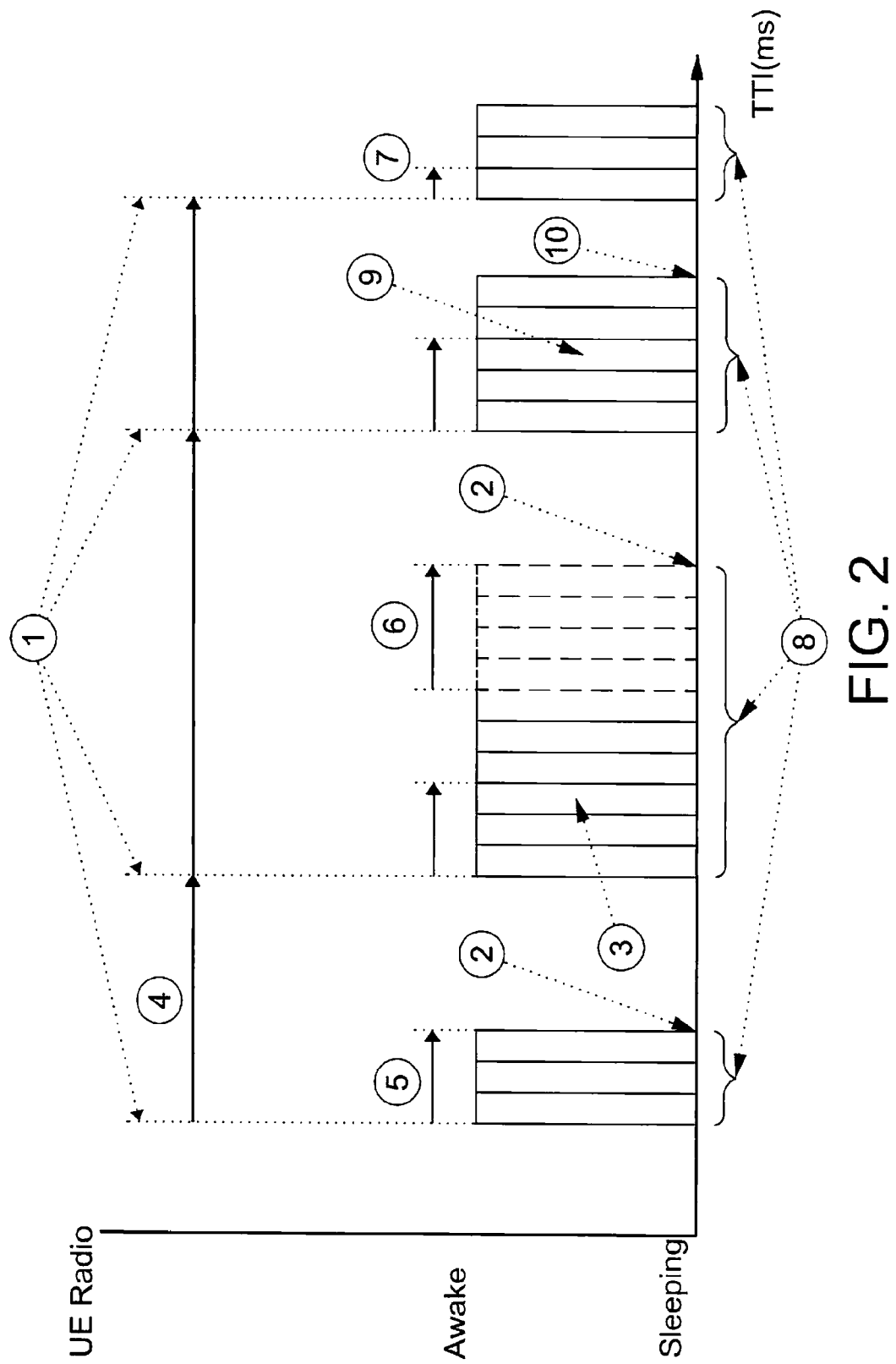
FIG. 2 shows a diagram with some of the definitions used in this text.

FIG. 2 shows the UE radio state as a function of time, the time being shown in TTIs, Transmission Time Intervals. The numerals used in FIG. 2 correspond to the following definitions or events:
1. Wake up points, points in time at which a UE wakes up, or in other words goes from a DRX state to a listening state.
2. Implicit go to sleep order: if the UE does not receive any data during the on duration period, it assumes the DRX state.
3. Implicit Stay awake order: if the UE receives any Best Effort data during an on duration period it extends the current on duration period by a certain predetermined amount of time, suitably the length of one more on duration periods.
4. DRX intervals, intervals with which a certain DRX pattern is repeated.
5. On-duration period: a period in time during which the UE waits for the reception of data, after waking up from DRX.
6. Inactivity timer: a duration in time that the UE waits to successfully receive data (decode PDCCH) from the last reception of data (decoding of PDCCH), failing which the UE re-enters the DRX state, i.e. the non-listening state. The UE restarts the activity timer following a single reception of data (decoding of a PDCCH).
7. One TTI, Transmission Time Interval.
8. "Awake" time for the UE.
9. Explicit stay awake: an eNodeB may send an explicit order to a UE to stay awake, usually by means of so called MAC signalling.
10. Explicit go to sleep: an eNodeB may send an explicit order to a UE to go to sleep, usually by means of so called MAC signalling.

In addition to the periods and events shown in FIG. 2, there also exists the notion of a "DRX period", i.e. a period during which the UE assumes an idle state, i.e. it does not listen for data during this period. This period may be variable, and normally equals the DRX interval minus the awake time during the DRX interval.

Returning now to the present invention, the invention is, as has been mentioned previously, intended to address problems with the DRX state, and different kinds of transmissions, such as transmissions which use HARQ and RLC, mainly problems involving retransmissions (HARQ) and transmissions in more than one TTI (mainly RLC).

The invention proposes to address these problems by means of taking into account the following:
the original transmissions,
N possible additional transmissions, in consecutive TTIs (RLC segmentation, although the invention does not necessarily rely on the segments being in consecutive TTIs, but could also work, for example, in conjunction with a scheduler that could prioritize the sending of RLC segments),
N possible additional transmissions, in non consecutive TTIs (e.g. HARQ retransmissions or RLC segments).

Very basically, the invention proposes a solution in which the DRX scheme is bound to the type of transmission, so that one DRX scheme can be used for transmissions that employ HARQ-like principles, and another DRX scheme may be used for transmissions that employ RLC principles.

In the following, two different embodiments of the invention will be described, one which is adapted to HARQ-principles, and another one which is adapted to RLC principles.

First Embodiment, HARQ Principles

In this embodiment, the DRX scheme is configured without considering HARQ retransmissions, i.e. the wake up occasions correspond to the expected first transmissions.

For downlink transmission, i.e. for transmissions from the eNodeB to the UE, if no data is received during a configured wake-up period, the UE immediately enters the DRX state again until the next configured wake-up period. If a transmission has been received, the UE stays awake at least:
   a) when it transmits the HARQ ACK/NACK;
   b) and, if a NACK is transmitted, when the retransmission is expected.

This can be done outside of the DRX pattern, i.e. the UE is awake at the known occasions a) and b) until it has transmitted a HARQ ACK and no further retransmissions are expected. The UE can also optionally go to sleep between occasions a) and b).

When HARQ principles are employed by the system, a case can be envisioned in which the UE transmits a HARQ ACK but the eNodeB misreads this as a HARQ NACK. In such a case, i.e. misreading of ACK as NACK, if the UE is in the DRX state right after sending the HARQ ACK, the retransmission from the eNodeB, and any subsequent retransmission attempts, will be lost. This will lead to the maximum number of retransmissions being performed by the eNodeB even if the UE received the data in the first attempt.

In order to cover this case, i.e. the case where the UE transmits a HARQ ACK but the eNodeB misreads this as a HARQ NACK, the following functionality can be added to the method of the invention:

To address this error case, the UE can extend its stay in the on duration state by a predefined period of time, or until it is clear to the UE that no retransmissions are attempted by the eNodeB, i.e. the UE does not receive any retransmission from the eNodeB during the time a retransmission would have been performed if a transmitted ACK had been misread as a NACK. This will thus reduce the risk of the eNodeB reaching the maximum number of retransmissions.

Tying the resumption of the DRX state to the HARQ, as suggested above, has as an additional benefit in that it achieves the same result as an explicit "go to sleep request" to the UE from the eNodeB after a successful reception/transmission. Thus, the eNodeB will know that the UE is in the DRX state or not.

For uplink transmissions, i.e. transmissions from the UE to the eNodeB, a similar behaviour as that suggested above for the downlink can be applied: After the UE has transmitted a data unit to the eNodeB, it does not immediately assume the DRX state. Instead, it waits for the HARQ ACK/NACK from the eNodeB, i.e. the UE must "be awake" at least when the ACK/NACK is expected. If a NACK is received, the UE must also be awake when the retransmission is performed, similarly to that which has been described above for the downlink.

It should be pointed out that "waking up" above includes the case when "blind detection" is used (even for retransmissions), i.e. the case where a UE instead of waking up only for one specific TTI would instead listen for data during a small interval.

Second Embodiment, RLC Segmentation

This is an embodiment which is particularly suitable for DRX in combination with RLC segments/RLC segmentation.

In this embodiment, the DRX scheme is configured without considering any possible use of RLC segmentation, i.e. the wake up occasions correspond to the expected first transmissions.

For downlink transmissions, i.e. from the eNodeB to the UE, if no data is received during a configured wake-up period, the UE will immediately enter the DRX state and remain there until the next configured wake-up period. If a transmission has been received, the UE stays awake at least:

a) if it detects that the data received contains an RLC PDU (Protocol Data Unit) segment; and
b) until all RLC segments are properly received. Either the UE can stay awake to receive all such segments, or the UE will "know" that in similarity to HARQ retransmission, the next RLC segment(s) will not come until a certain amount of TTIs have passed. If the UE sends a NACK, it can "sleep" as per the HARQ principles explained above, although it must wake up if a segment is expected during that time. One aspect of this is that the RLC segments won't trigger a new on-duration period, and in particular, when the last segment is received, the UE can enter the DRX state.

The "awake times" described immediately above can be kept outside of the ordinary DRX pattern, i.e. the UE will be awake at known occasions a) and b) until it has transmitted a HARQ ACK for all RLC segments and no further RLC segments are expected.

Tying the wake-up time of the UE with the detection of RLC segments in this way has the additional benefit of achieving the same as an explicit "on duration" or "go to continuous level request" from the eNodeB when sending a data unit over several TTIs (which are possibly, but not necessarily consecutive) and also the same effect as an explicit "go to sleep request", i.e. "enter DRX" from the eNodeB to the UE after successful reception/transmission.

For uplink transmissions, i.e. from the UE to the NodeB, a similar pattern can be applied. After the UE has transmitted a segmented data unit, it will not immediately go to sleep, but will instead continue sending all RLC segments, i.e. the UE must be awake at least until all segments are sent and until they are acknowledged.

Figure 3:
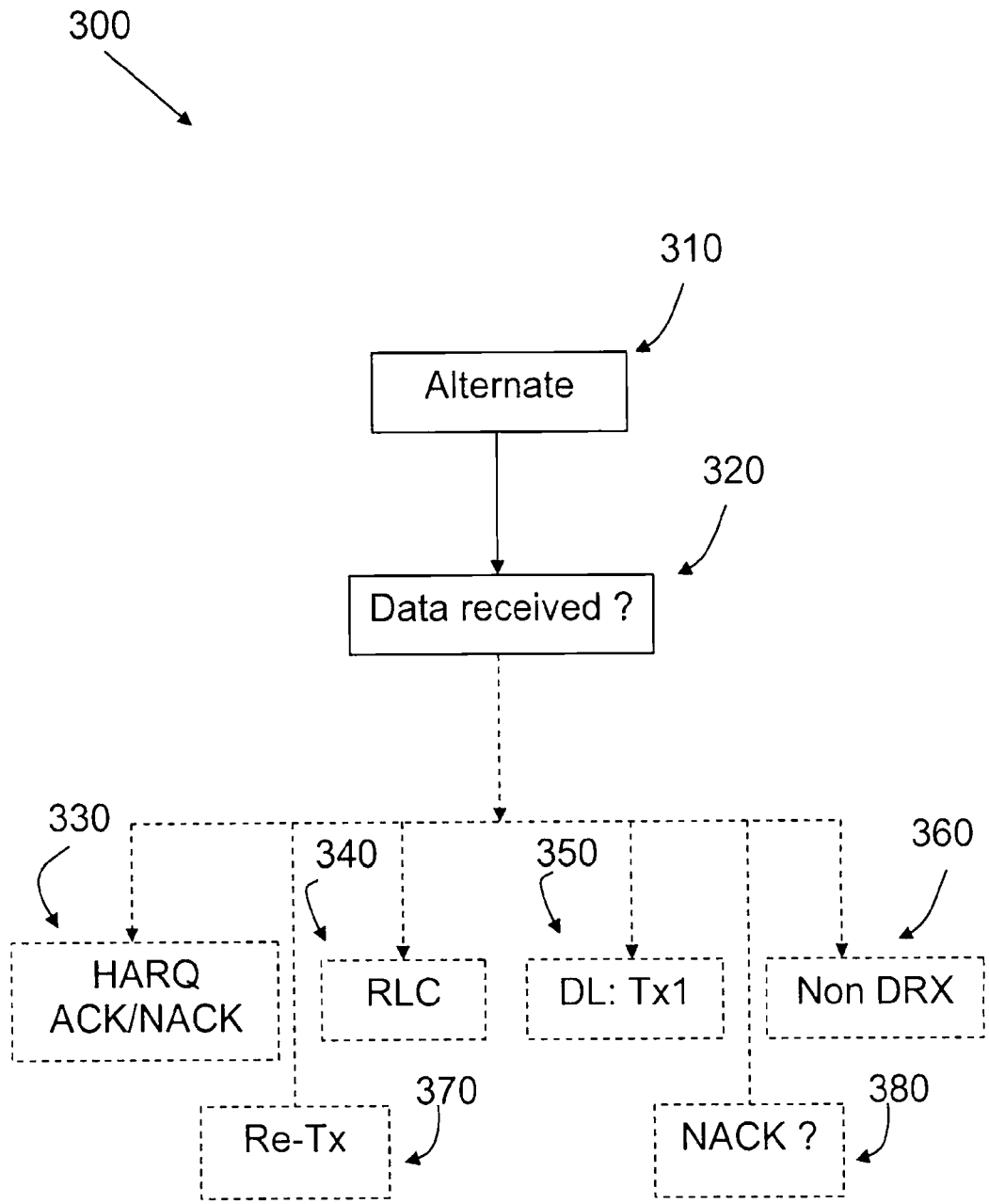
FIG. 3 shows a flow chart of a method of the invention, and, FIG. 4 shows a block diagram of a transceiver of the invention.

FIG. 3 is a flow chart of some steps of a method 300 of the invention. Steps which are options or alternatives have been indicated with dashed lines. Thus, as indicated in FIG. 3, according to the method 300, a UE in the system in which the invention is applied is able to alternate, step (310, between the two states mentioned previously in this text according to a certain scheme, with this scheme being dependent on whether or not data units which are transmitted between the UE and its controlling node are received entirely and correctly within an initially allocated resource for each data unit, as shown in step 320.

Step 330 shows that according to the method of the invention, the scheme for altering between the two states can in one embodiment be adapted to accommodate HARQ ACK/NACK transmissions between the UE and its controlling node. As shown in step 340, in one embodiment of the method 300, the scheme for altering between the two states can also be adapted to accommodate RLC segmentation between the UE and its controlling node.

Step 350 of FIG. 3 shows that, in another embodiment of the method 300, for transmissions from the controlling node to the UE, i.e. down link, "DL", the occasions when the UE goes from the non-listening state to the listening state can be scheduled to correspond to expected first transmissions of data from the controlling node.

Step 360 shows that a UE can remain in the listening state ("non-DRX") until:
the UE has transmitted the corresponding ACK/NACK; and
if a NACK is transmitted, until the corresponding retransmission is expected, and
if the received data comprises an RLC PDU segment, until all the data has been received.

As indicated in step 370, if the UE transmits an ACK, the UE extends its stay in the listening state by a predefined period of time, to ensure that the UE does not receive any retransmission ("Re-TX") from the controlling node during the time that a retransmission would have been performed if an ACK transmitted by the UE had been misread by the controlling node as a NACK.

Step 380 shows that for transmissions from the UE to the controlling node, after the UE has transmitted a data unit to the controlling node, the UE waits for the ACK/NACK from the controlling node before assuming the non-listening state, and if a NACK is received, the UE is in the listening state when the retransmission is expected.

Figure 4:
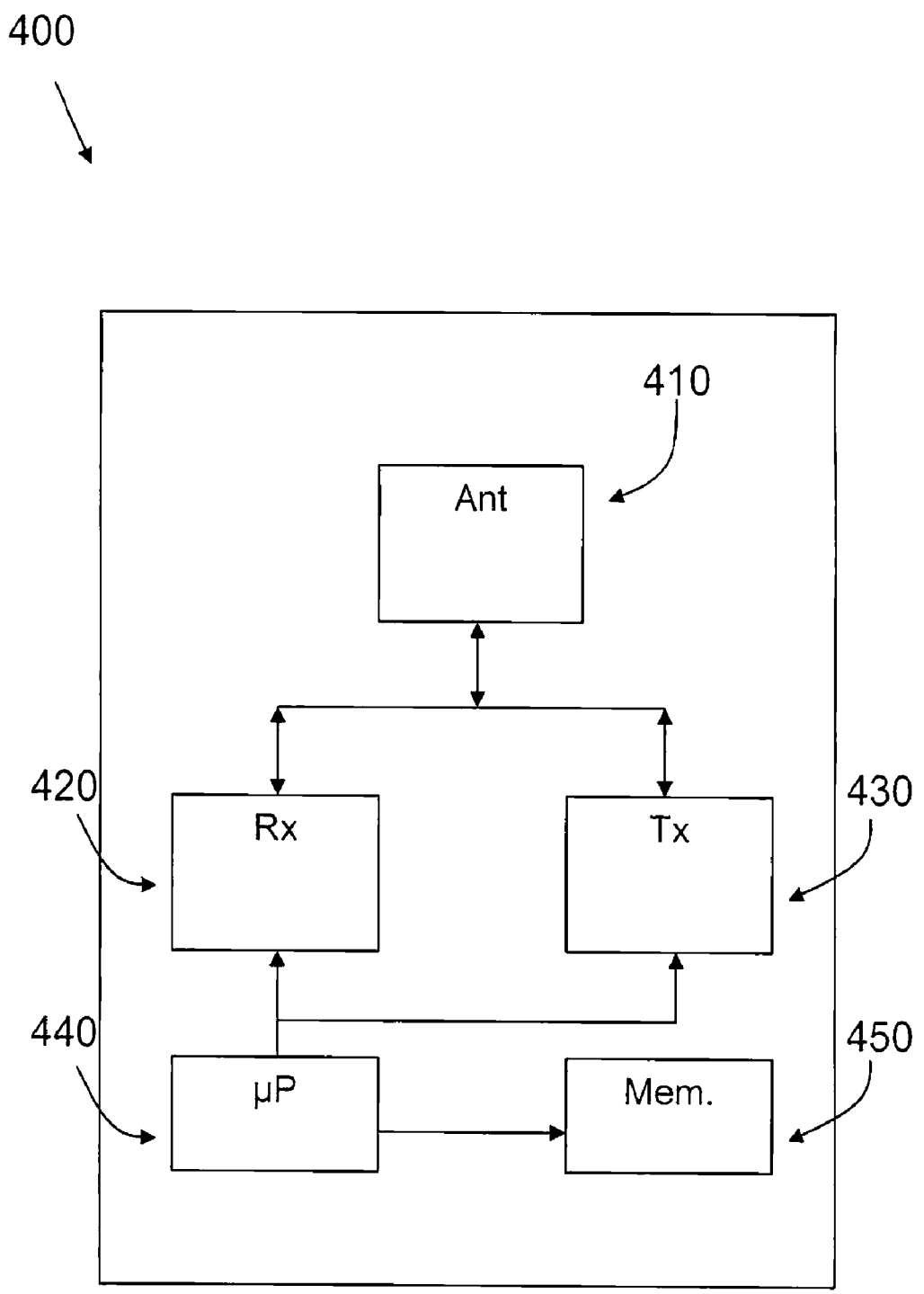

FIG. 4 shows a rough block diagram of a transceiver 400 of the invention, for use as a UE which basically functions as described above. As can be seen in FIG. 4, the UE 400 of the invention comprises an antenna 410 for communicating with the eNodeB, and also comprises a transmitter 430 and a receiver 420. In addition, the UE 400 also comprises control means such as for example a microprocessor 440, as well as comprising a memory 450.

The transceiver 400 basically comprises means for functioning according to the method described above, and thus comprises means such as the controller 440 and the memory 450 for assuming one of at least two different states, a first such state being an idle state, a DRX state, and a second such state being a listening state, an "on duration" state, each state being assumed for a certain amount of time. Suitably, the controller 440 controls the length of time for the DRX and non DRX periods, which it can retrieve from the memory 450.

It should be noted that although the controller 440 and the memory are depicted here as being part of the alternating mechanism, the antenna 410 and the receiver 420 may also be a part of this mechanism, if, for example, the eNodeB transmits information or commands relevant to the alternating.

However, the alternating means, in this case the means 440, 450, make the scheme according to which the UE alternates between said two states dependent on whether or not data units which are transmitted between the UE and its controlling node are received entirely and correctly within an initially allocated resource for each data unit.

In the UE 400 of the invention, the alternating means 440, 450, may also adapt the scheme for altering between the two states to accommodate HARQ ACK/NACK transmissions between the UE 400 and its controlling node, e.g. the eNodeB. Alternatively, the alternating means 440, 450, may adapt the scheme for altering between the two states to accommodate RLC segmentation between the UE 400 and its controlling node 110.

In one embodiment of the UE 400, the above mentioned initially allocated resource is one of the following:
- a resource in time, e.g. a TTI
- a resource in frequency, e.g. a sub-frame or a resource block
- a Modulation and Coding Scheme, i.e. a modulation, a code rate and a number of transmission bits.

In a further embodiment of the UE 400, in the case of transmissions from the controlling node to the UE, the alternating means 400, 450, schedule the occasions when the UE goes from the non-listening state to the listening state to correspond to expected first transmissions of data from the controlling node.

Also, if no data has been received by the UE during a listening period, the alternating means 440, 450, may make the UE enter the non-listening state immediately, and if data has been received, the alternating means 440, 450, can make the UE remain in the listening state until:
- the UE has transmitted the corresponding ACK/NACK: and
- if a NACK is transmitted, until the corresponding retransmission is expected, and
- if the received data comprises an RLC PDU segment, until all the data has been received.

Additionally, if the UE transmits an ACK, the alternating means 440, 450, may make the UE extend its stay in the listening state by a predefined period of time, in order to ensure that the UE does not receive any retransmission from the controlling node during the time that a retransmission would have been performed if an ACK transmitted by the UE had been misread by the controlling node as a NACK.

In another embodiment of the invention, for Uplink, UL, transmissions, after the UE has transmitted a data unit to the controlling node, the alternating means 440, 450, make the UE wait for the ACK/NACK from the controlling node before assuming the non-listening state, and if a NACK is received, the UE is kept in the listening state when the retransmission from the controlling node is expected.

The invention is not limited to the examples of embodiments described above and shown in the drawings, but may be freely varied within the scope of the appended claims. For example, although the invention has mainly been described above with terms from systems of the LTE kind, the invention may be applied to other kinds of wireless cellular access systems.

Also, in a slightly different aspect of the invention, the following principles may be applied:
- For HARQ and RLC segments a specific a DRX scheme is used, which scheme is independent of the "main" DRX scheme, and which has the following principles:
  - for HARQ and RLC segmentation
    - the UE is allowed to sleep in-between transmissions subsequent to the initial transmission; the time the UE sleeps may be X TTIs, where X is configured by eNodeB to the UE using e.g. RRC signalling (for asynchronous HARQ and for RLC segments) or a predefined value based on physical layer property (for synchronous HARQ e.g. LTE uplink). After X TTIs, the UE wakes up, and listens until the transmission is received.
    - the UE stays awake until all subsequent transmissions belonging to the initial transmissions have completed, either HARQ or RLC, or both.
  - In both cases, the UE can go back to the DRX state as soon as the transmission after which it may resume sleeping is received. Obviously, the UE may not assume the DRX state if the "main" DRX scheme would not allow it otherwise.

The invention claimed is:

1. A method for use in a cellular wireless access system, in which system there is a first controlling node which controls transmissions to and from user terminals (UEs) within a certain area, and in which system UEs assume one of at least two states, the at least two states including a first non-listening state wherein a UE does not listen for data from its controlling node, and a second listening state, said method comprising:
   a UE alternating between said at least two states in dependence on whether or not data units which are transmitted between the UE and the controlling node are received entirely and correctly within an initially allocated resource for each data unit, as allocated by the controlling node;
   wherein, for transmissions from the controlling node to the UE, the UE:
   enters the non-listening state from the listening state if no data was received during a listening period; and
   extends its stay in the listening state by a predefined period of time if the UE transmits an ACK to the controlling node to ensure that the UE does not receive any retransmission from the controlling node during the time that a retransmission would have been performed if an ACK transmitted by the UE had been misread by the controlling node as a NACK.

2. The method of claim 1, wherein alternating between the at least two states is configured to accommodate HARQ ACK/NACK transmissions between the UE and its controlling node.

3. The method of claim 1, wherein alternating between the at least two states is configured to accommodate RLC segmentation between the UE and its controlling node.

4. The method of claim 1, wherein the initially allocated resource is chosen from one of the following: a resource in time; a resource in frequency; and a Modulation and Coding Scheme.

5. The method of claim 1, wherein said alternating includes scheduling occasions at which the UE goes from the non-listening state to the listening state to correspond to expected first transmissions of data from the controlling node.

6. The method of claim 5, wherein as a further aspect of said alternating, if data has been received during the listening period, the UE remains in the listening state until: the UE has transmitted the corresponding ACK/NACK; and, if a NACK is transmitted, until the corresponding retransmission is expected, or, if the received data comprises an RLC PDU (Protocol Data Unit) segment, until all the data has been received.

7. The method of claim 1, wherein as part of said alternating, for transmissions from the controlling node to the UE, after the UE has transmitted a data unit to the controlling node, the UE waits for the ACK/NACK from the controlling node before changing from the listening state to the non-listening state, and if a NACK is received, the UE remains in or transitions to the listening state for the time when the retransmission from the controlling node is expected.

8. The method of claim 1, wherein the cellular wireless access system comprises an LTE system, and wherein the first, non-listening state is the DRX state, and the controlling node is an eNodeB.

9. A transceiver for use as a User Terminal (UE) in a cellular wireless access system, in which system there is a first controlling node which controls transmissions to and from the UE, the UE comprising:
transceiver circuits for sending data to the controlling node and receiving data from the controlling node; and
a control circuit configured to alternate the UE between at least two states, the at least two states including a first non-listening state where the UE does not listen for data from the controlling node, and a second listening state;
wherein said control circuit is configured to alternate the UE between said at least two states in dependence on whether or not data units which are transmitted between the UE and the controlling node are received entirely and correctly within an initially allocated resource for each data unit, as allocated by the controlling node; and
wherein, for transmissions from the controlling node to the UE, the control circuit is configured to:
make the UE enter the non-listening state from the listening state if no data was received during a listening period; and
make the UE extend its stay in the listening state by a predefined period of time if the UE transmits an ACK to the controlling node, to ensure that the UE does not receive any retransmission from the controlling node during the time that a retransmission would have been performed if an ACK transmitted by the UE had been misread by the controlling node as a NACK.

10. The UE of claim 9, wherein the control circuit is configured to adapt its alternating between the at least two states to accommodate HARQ ACK/NACK transmissions between the UE and the controlling node.

11. The UE of claim 9, wherein the control circuit is configured to adapt its alternating between the at least two states to accommodate RLC segmentation between the UE and the controlling node.

12. The UE of claim 9, in which the initially allocated resource comprises one of the following: a resource in time, a resource in frequency; and a Modulation and Coding Scheme.

13. The UE of claim 9, wherein, for transmissions from the controlling node to the UE, the control circuit is configured to schedule the occasions when the UE goes from the non-listening state to the listening state to correspond to expected first transmissions of data from the controlling node.

14. The UE of claim 13, wherein the control circuit is configured to make the UE remain in the listening state, if data was received during the listening period, until: the UE has transmitted the corresponding ACK/NACK; and, if a NACK is transmitted, until the corresponding retransmission is expected; or, if the received data comprises an RLC PDU (Protocol Data Unit) segment, until all the data has been received.

15. The UE of claim 9, wherein, for transmissions from the UE to the controlling node, after the UE has transmitted a data unit to the controlling node, the control circuit is configured to make the UE wait for the ACK/NACK from the controlling node before assuming the non-listening state, and, if a NACK is received, to maintain the UE in the listening state, or to change the UE to the listening state, for the time when the retransmission from the controlling node is expected.

16. The UE of claim 9, wherein the UE is configured for use in an LTE system, and wherein the first, non-listening state is the DRX state, and the controlling node is an eNodeB.

* * * * *

UNITED STATES PATENT AND TRADEMARK OFFICE
CERTIFICATE OF CORRECTION

| | | |
|---|---|---|
| PATENT NO. | : 8,238,281 B2 | Page 1 of 1 |
| APPLICATION NO. | : 12/596782 | |
| DATED | : August 7, 2012 | |
| INVENTOR(S) | : Pelletier et al. | |

It is certified that error appears in the above-identified patent and that said Letters Patent is hereby corrected as shown below:

In the Specifications:

In Column 7, Line 29, delete "ACK/NACK:" and insert -- ACK/NACK; --, therefor.

Signed and Sealed this
Eighteenth Day of December, 2012

David J. Kappos
*Director of the United States Patent and Trademark Office*